United States Patent
Griffin et al.

(10) Patent No.: US 12,028,236 B2
(45) Date of Patent: Jul. 2, 2024

(54) CONSENSUS DRIVEN SERVICE PROMOTION

(71) Applicant: Red Hat, Inc., Raleigh, NC (US)

(72) Inventors: Leigh Griffin, Waterford (IE); Cathal O'Connor, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/560,751

(22) Filed: Dec. 23, 2021

(65) Prior Publication Data
US 2023/0208744 A1 Jun. 29, 2023

(51) Int. Cl.
| | |
|---|---|
| H04L 43/55 | (2022.01) |
| H04L 9/40 | (2022.01) |
| H04L 41/5054 | (2022.01) |
| H04L 43/08 | (2022.01) |
| H04L 67/00 | (2022.01) |
| H04L 67/51 | (2022.01) |

(52) U.S. Cl.
CPC .......... *H04L 43/55* (2022.05); *H04L 41/5054* (2013.01); *H04L 43/08* (2013.01); *H04L 63/10* (2013.01); *H04L 67/34* (2013.01); *H04L 67/51* (2022.05)

(58) Field of Classification Search
CPC . H04L 67/60; H04L 9/06; H04L 43/08; H04L 67/34; H04L 67/51; H04L 9/50; H04L 63/12; H04L 63/102; H04L 43/55; H04L 41/5054; H04L 63/10; H04L 43/0817
See application file for complete search history.

(56) References Cited

U.S. PATENT DOCUMENTS

| | | | |
|---|---|---|---|
| 7,000,224 B1* | 2/2006 | Osborne, II | G06F 11/3688 717/125 |
| 10,915,437 B1* | 2/2021 | Arguelles | G06F 11/3688 |
| 2003/0060189 A1* | 3/2003 | Minear | H04L 63/12 455/560 |
| 2003/0229825 A1* | 12/2003 | Barry | G06F 11/3688 714/38.14 |
| 2009/0328008 A1* | 12/2009 | Mital | G06F 11/3612 717/129 |
| 2017/0017655 A1* | 1/2017 | Pinto | G06F 16/951 |

(Continued)

OTHER PUBLICATIONS

Uriarte, Rafael Brundo, et al., "Distributed service-level agreement management with smart contracts and blockchain," Concurrency and Computation: Practice and Experience, Mar. 13, 2020, 17 pages.

(Continued)

*Primary Examiner* — Ramy M Osman
(74) *Attorney, Agent, or Firm* — Womble Bond Dickinson (US) LLP

(57) ABSTRACT

Processing logic may monitor testing of a candidate service with one or more services to determine if one or more criteria are satisfied. The one or more criteria may be defined in a smart contract on a blockchain. In response to the one or more criteria being satisfied, processing logic may initiate a transaction of the blockchain which causes each of the one or more services to validate the one or more criteria. In response to the one or more services validating that the one or more criteria are satisfied, processing logic may promote the candidate service.

20 Claims, 6 Drawing Sheets

(56) References Cited

U.S. PATENT DOCUMENTS

| | | | | |
|---|---|---|---|---|
| 2017/0230349 | A1* | 8/2017 | Gaur | H04L 63/0807 |
| 2017/0242774 | A1* | 8/2017 | Gopu | G06F 11/3688 |
| 2018/0295030 | A1* | 10/2018 | Saha | H04L 41/0823 |
| 2019/0303541 | A1 | 10/2019 | Reddy et al. | |
| 2019/0303579 | A1 | 10/2019 | Reddy et al. | |
| 2019/0303623 | A1* | 10/2019 | Reddy | H04L 9/3242 |
| 2019/0305957 | A1* | 10/2019 | Reddy | H04L 63/123 |
| 2019/0305959 | A1 | 10/2019 | Reddy et al. | |
| 2020/0177457 | A1* | 6/2020 | Seenappa | H04L 41/0873 |
| 2020/0241929 | A1* | 7/2020 | Arrasjid | G06F 11/3006 |
| 2020/0252219 | A1* | 8/2020 | Singi | H04L 63/12 |
| 2020/0366580 | A1* | 11/2020 | Sinha | H04L 43/0823 |
| 2021/0174634 | A1* | 6/2021 | Purohit | H04L 9/0894 |
| 2021/0256113 | A1* | 8/2021 | Stott | H04L 63/02 |
| 2021/0342329 | A1 | 11/2021 | Padmanabhan | |
| 2021/0406003 | A1* | 12/2021 | Crabtree | H04L 63/12 |
| 2022/0100649 | A1* | 3/2022 | Pönitsch | G06F 11/3688 |
| 2022/0358030 | A1* | 11/2022 | Yanamala | H04L 9/3247 |
| 2023/0176859 | A1* | 6/2023 | Kushmerick | G06N 3/045 |
| | | | | 717/120 |
| 2023/0208744 | A1* | 6/2023 | Griffin | H04L 43/55 |
| | | | | 709/226 |

OTHER PUBLICATIONS

Tonelli, Roberto, et al., "Implementing a Microservices System with Blockchain Smart Contracts," 2nd International Workshop on Emerging Trends in Software Engineering for Blockchain, 2019, 10 pages.
Uriarte, Rafael Brundo, et al, "Towards Distributed SLA Management with Smart Contracts and Blockchain," ResearchGate, Dec. 2018, 7 pages.

* cited by examiner

CONSENSUS DRIVEN SERVICE PROMOTION

TECHNICAL FIELD

Aspects of the present disclosure relate to promotion of a service, and more particularly, to a consensus driven service promotion.

BACKGROUND

Computers may execute instructions that are grouped together as a computer program to perform one or more actions. Computer programs, or applications, may run locally on the computer and be exposed to remote clients through the internet. They can provide functionality and services to clients through a private or public network.

An application may have a monolithic architecture, where all processes are tightly coupled and run as a single service on the computer. With such an architecture, if one process of the application experiences a heavy workload or otherwise becomes hampered, the entire application may be effected. Further, adding or upgrading a monolithic application may be cumbersome due to the size of the code base of the application. An entire application may be taken offline for an extended period of time due to changes to a relatively small portion of the application. Thus, upgrades to an application may be complex and draw resources while consuming attention, and planning.

BRIEF DESCRIPTION OF THE SEVERAL VIEWS OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
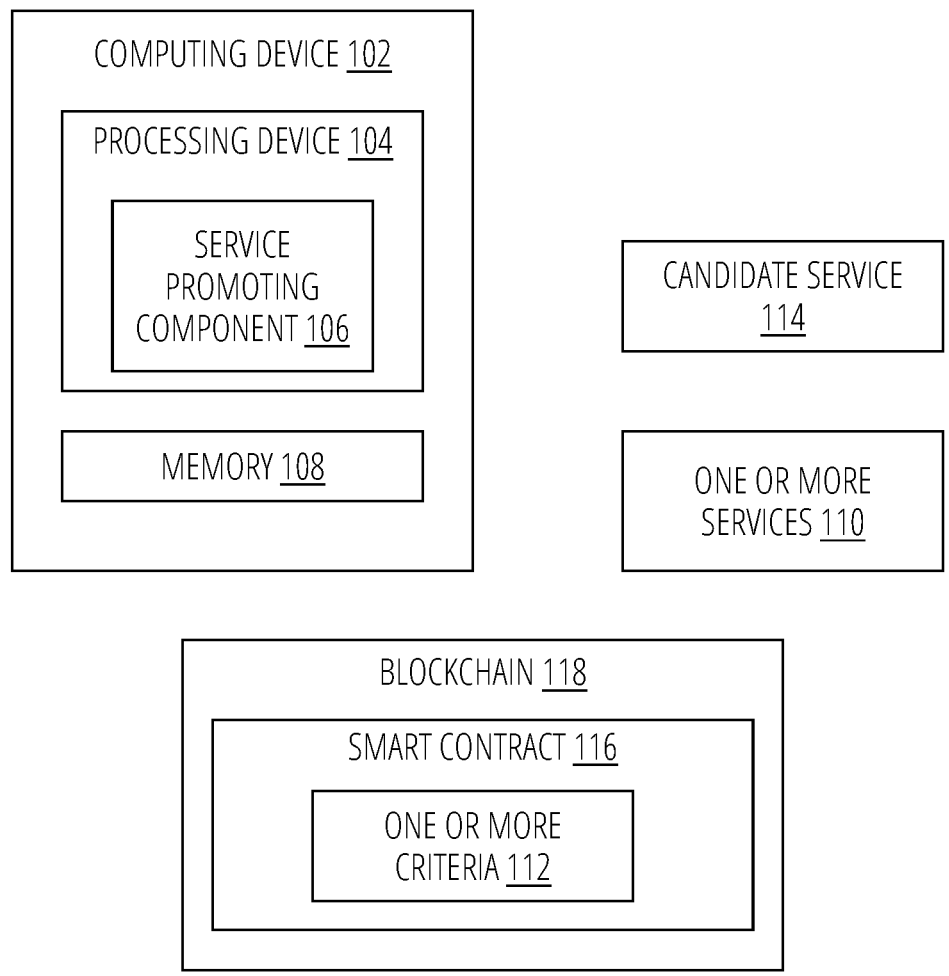
FIG. 1 shows a block diagram of a computing device that promotes a candidate service based on a consensus of one or more services, in accordance with some embodiments.

With a microservices architecture, an application is developed and built as independent services that, during runtime, each perform its own process. These services communicate with each other such that, to a user, they appear as a single application. Because they are independently run, each service can be updated, deployed, and scaled to meet demand for specific functions of an application.

An application with a microservices architecture lets developers make changes to an application without fully redeploying the entire application. Unlike application development for monolithic architectures, individual services of a microservices application may be built by small teams with the flexibility to choose their own tools and coding languages. Services of a common microservices application may be built independently of each other, communicate with each other, can individually fail, and individually be modified and redeployed. Thus, an upgrade or fix to part of the microservices application may not result in an application-wide outage.

Each service of a microservices application may rely on other services to provide complete functionality to a user. For example, if a user of an online retail application wishes to purchase a product through an online application, the user may wish to know if the product is in stock. A service with access to the retailer's inventory database may communicate with the retailer's frontend service, which may in turn, communicate with an online shopping cart service. If the retailer added another feature that provided in-app product recommendations, this feature could be built into a new service that is to communicate with a database of product tags in order to make recommendations, while also communicating with the retailer's inventory database.

Service-to-service communication supports the microservices architecture by allowing many individual services to operate together such that they serve clients like a single application. Although a microservices architecture has more flexibility than a monolithic architecture, upgrading an existing service or adding a new service into a microservices application is not without issues.

In conventional systems, a developer of a microservices application may promote a candidate service, which may be new or upgraded service, between environments. For example, a developer may move the candidate service from a development environment to a staging environment, or from a staging environment to a production environment. Promoting the candidate service from one environment to another, however, may involve testing and verification of the candidate service. A developer may test the candidate service in during development or staging to build confidence in the candidate service and to check for compatibility with the remaining services in the microservices application. Such a process may draw the developers time, attention, and be error prone. Further, after the candidate service has been promoted, the metrics which the developer used to build confidence in the candidate service may be lost, if the developer has not manually documented the process in which the candidate service was promoted. Further, different developers may document the process in a different manner, which may reduce the usefulness of such records, if a user must sift through many such records for many different processes to examine the validation metrics of a given service.

Aspects of the disclosure address the above-noted issues and other deficiencies by processing logic that monitors testing of a candidate service with one or more services to determine if one or more criteria are satisfied. The one or more criteria may be included in a smart contract on a blockchain. In response to the one or more criteria being satisfied, processing logic may initiate a transaction of the blockchain which causes each of the one or more services to validate the one or more criteria. In response to the one or more services validating that the one or more criteria are satisfied, processing logic may promote the candidate service.

In such a manner, validation of a new or upgraded service may be performed in an automated manner with a blockchain and smart contract that holds and ensures satisfaction of one or more criteria. The remaining services may be leveraged as nodes on the blockchain, to validate that the new or upgraded service meets the one or more criteria, thereby building confidence in the new or upgraded service and providing additional checks and balances, while offloading work from the developer.

Processing logic may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

In some aspects, the blockchain or metadata of the blockchain which presents a provenance of the one or more criteria being satisfied by the candidate service is linked to the candidate service after the promoting. For example, the blockchain or metadata of the blockchain (e.g., a copy of the smart contract) may be stored in memory with the candidate service (e.g., in a directory that is shared with or associated with the source code or a machine language version of the candidate service) so that the provenance of the candidate service may be preserved. A user may simply refer to the smart contract to read what criteria the candidate service satisfied to be promoted from one environment to another.

FIG. 1 shows a block diagram of a computing device 102 that generates a one or more criteria 112 of one or more services 110, in accordance with some embodiments.

Computing device 102 includes a processing device 104 and a memory 108. Memory 108 may include volatile memory devices (e.g., random access memory (RAM)), non-volatile memory devices (e.g., flash memory) and/or other types of memory devices.

Processing device 104 includes a service promoting component 106. Service promoting component 106 may monitor testing of a candidate service with one or more services 110 to determine of one or more criteria 112 are satisfied. The one or more criteria 112 may be included in a smart contract 116 that exists on a blockchain 118.

A blockchain 118 may be understood as a distributed database that is shared among nodes of a computer network. In some examples, computing device 102 and each of the one or more services 110 may serve as a node of blockchain 118. Blockchain 118 stores information electronically in digital format like a database, but with additional features. Blockchain holds information in groups, known as blocks. A blockchain transaction requests additional information to be stored to the blockchain as a new block. Further, each node of a blockchain independently maintains a version of the blockchain, thus forming a distributed database or ledger. The nodes of a blockchain are to reach a consensus in order for the block to be added across the distributed database, thereby creating redundancy. Each block to the blockchain is added using a hashing algorithm which may be checked by any of the nodes of the blockchain. Thus, any one node may not simply erase a transaction after a consensus is reached by the nodes. As such, data on blockchain 118 is immutable.

Computing device 102 may initiate a transaction of the blockchain 118, in response to the one or more criteria satisfied. This transaction request causes each of the one or more services 110 to validate the one or more criteria 112.

Computing device 102 may promote the candidate service 114, in response to the one or more services validating that the one or more criteria are satisfied. The instructions for promoting the candidate service 114 may be embedded within the smart contract 116 and stored in logic that causes computing device 102 to promote the candidate service 114 in response to when the terms of the smart contract 116 are satisfied and validated by a consensus of nodes. The transaction completes when the logic of the smart contract 116 is carried out, for example, when the candidate service 114 is promoted, or when other logic is executed by computing device 102. These terms of the smart contract 116 may include the one or more criteria 112 that the candidate service 114 is to satisfy, as well as other terms. The transaction results in an immutable record of the candidate service and its validation. To reach a consensus, all nodes do not have to validate. In some examples, if at least a threshold amount of the blockchain nodes validate (e.g., more than half of the nodes, or at least 'x' amount of nodes), then a consensus may be reached, and the candidate node may be promoted.

As such, each of the respective nodes of the blockchain may corroborate that the candidate service has met a standard set of metrics in a given environment that may mirror the production environment. Such a system lends confidence to a developer that the candidate service will perform as intended and with a reduced risk in a promoted environment (e.g., the production environment).

Figure 2:
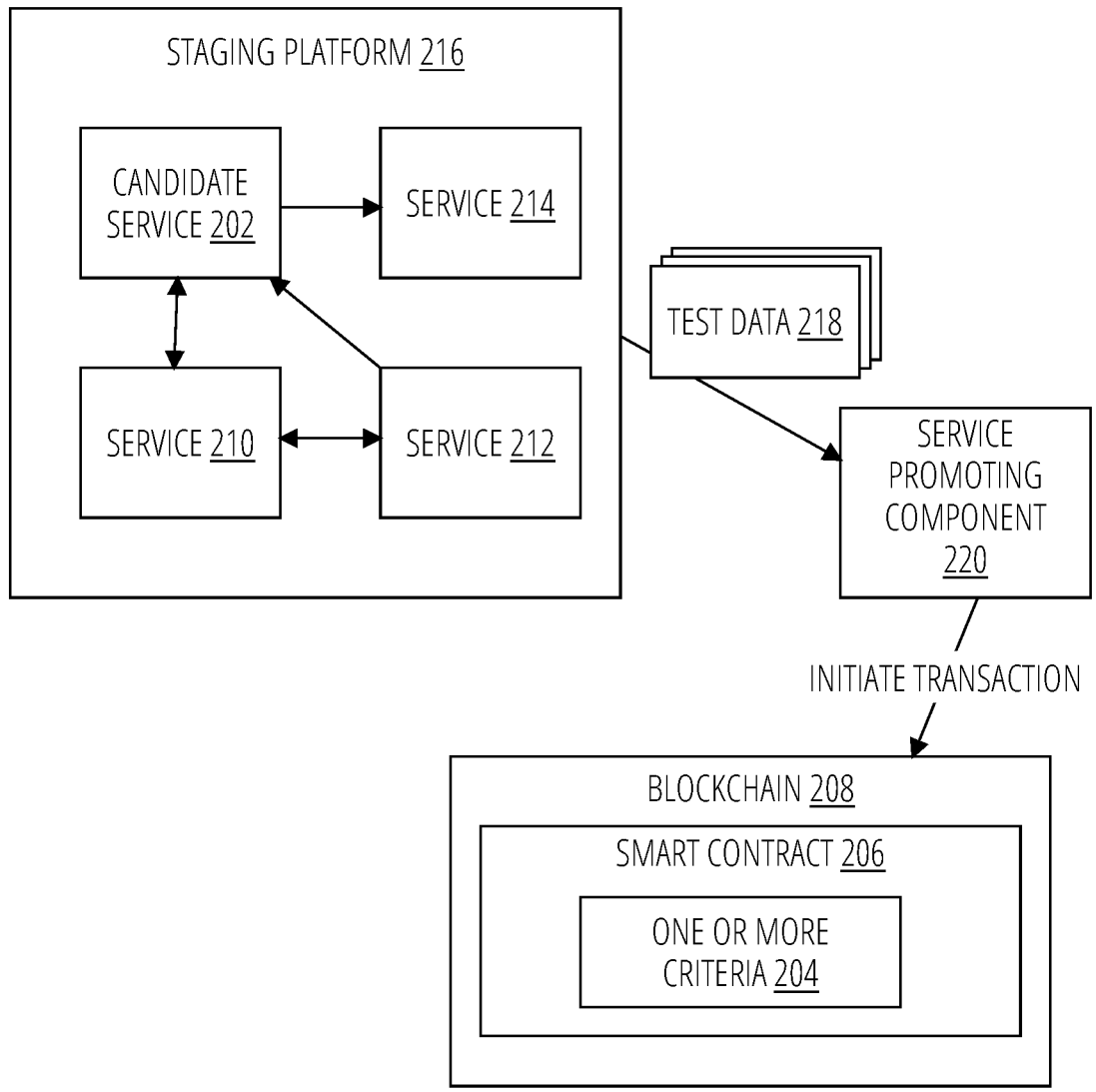
FIG. 2 shows an example initiation of a candidate service using blockchain, in accordance with some embodiments.

FIG. 2 shows an example initiation of a candidate service using blockchain, in accordance with some embodiments. A service promoting component 220 may monitor testing of a candidate service 202 with one or more services 210, 212, and 214, to determine if one or more criteria 204 are satisfied. The one or more criteria 204 are included in a smart contract 206 on a blockchain 208. Although shown as a single component, blockchain 208 may comprise a plurality of blockchain nodes that each maintain a version of the blockchain. Each of the service promoting component 220 and services 210, 212, and 214 may be a blockchain node on blockchain 208. Together, the candidate service 202 and services 210, 212, and 214 may also form a microservice application, which may eventually be deployed to a production platform where it may provide functionality to end users on one or more nodes that may be coupled to a private or public network.

The candidate service 202 and services 210, 212, and 214 may be built and deployed to a staging platform 216. Staging platform 216 may include a combination of hardware and software, such as computing devices and network infrastructure which supports testing of candidate service 202 with services 210, 212, and 214. As discussed, the candidate service 202 may be a new service or an updated version of an existing service.

Service promoting component 220 may obtain test data 218 to determine if the one or more criteria 204 are satisfied. In response to the one or more criteria 204 being satisfied, service promoting component 220 may initiate a transaction of the blockchain 208 which causes each of the one or more services 210, 212, and 214 to validate the one or more criteria.

The candidate service, however, is to first undergo testing under realistic conditions to build confidence in the candidate service, test for bugs and edge cases, and to verify that communication between services occur as intended. As such, staging platform 216 may imitate real-life conditions and use-cases of the microservices application. Service promoting component 220 may obtain test data 218 that may indicate various performance metrics of the candidate service 202, the microservices application as a whole, or a combination thereof.

For example, one or more criteria 204 may list a CPU utilization, a RAM utilization, or other computer system metric to be satisfied by the candidate service 202. Service promoting component 220 may listen to a system monitoring service to determine a CPU utilization, RAM utilization, or other computer system impact of the service promoting component 220. Service promoting component 220 may check to see if this criteria and others are met. For example, the one or more criteria 204 may define that the CPU utilization of the candidate service 202 is to be 'x'% or under, or the RAM utilization of the candidate service 202 is to be 'y'% or under, or a combination thereof. If this and other criteria are satisfied, service promoting component 220 may initiate the transaction with the blockchain 208 for promotion of the candidate service 202.

Additionally, or alternatively, one or more criteria 204 may list requirements for inter-service communications to verify that the services communicate as-intended. For example, it may be intended for a candidate service 202 to receive communications from service 210 and service 212. Similarly, candidate service 202 may be intended to send communications to service 210 and service 214. Further, it may be intended for service 210 and service 212 to communicate with each other. The service promoting component 220 may listen to communications between the service candidate 202 and other services 210, 212, and 214, for example, by monitoring a message queue or network traffic of the staging platform 216, to determine if the inter-service communications are occurring as intended. All services may communicate with each other under observation. The one or more criteria may specify a message accuracy of the candidate service. For example, the one or more criteria 204 may specify that 'x' number or % of the messages may not be dropped by the candidate service 202, or by other services. If this and other criteria are satisfied, service promoting component 220 may initiate the transaction with the blockchain 208 for promotion of the candidate service 202.

Additionally, or alternatively, one or more criteria 204 may list one or more tests that candidate service 202 must pass. These tests may include one or more use-cases by simulating inputs and states, and verifying outputs or states of the candidate services. If this and other criteria are satisfied, service promoting component 220 may initiate the transaction with the blockchain 208 for promotion of the candidate service 202.

Additionally, or alternatively, one or more criteria 204 may list requirements an up-time of the candidate service 202. For example, it may be intended for a candidate service 202 to be up and running (e.g., not stalled or crashed) at least 'n' % of the duration of time during staging. If this and other criteria are satisfied, service promoting component 220 may initiate the transaction with the blockchain 208 for promotion of the candidate service 202.

Figure 3:
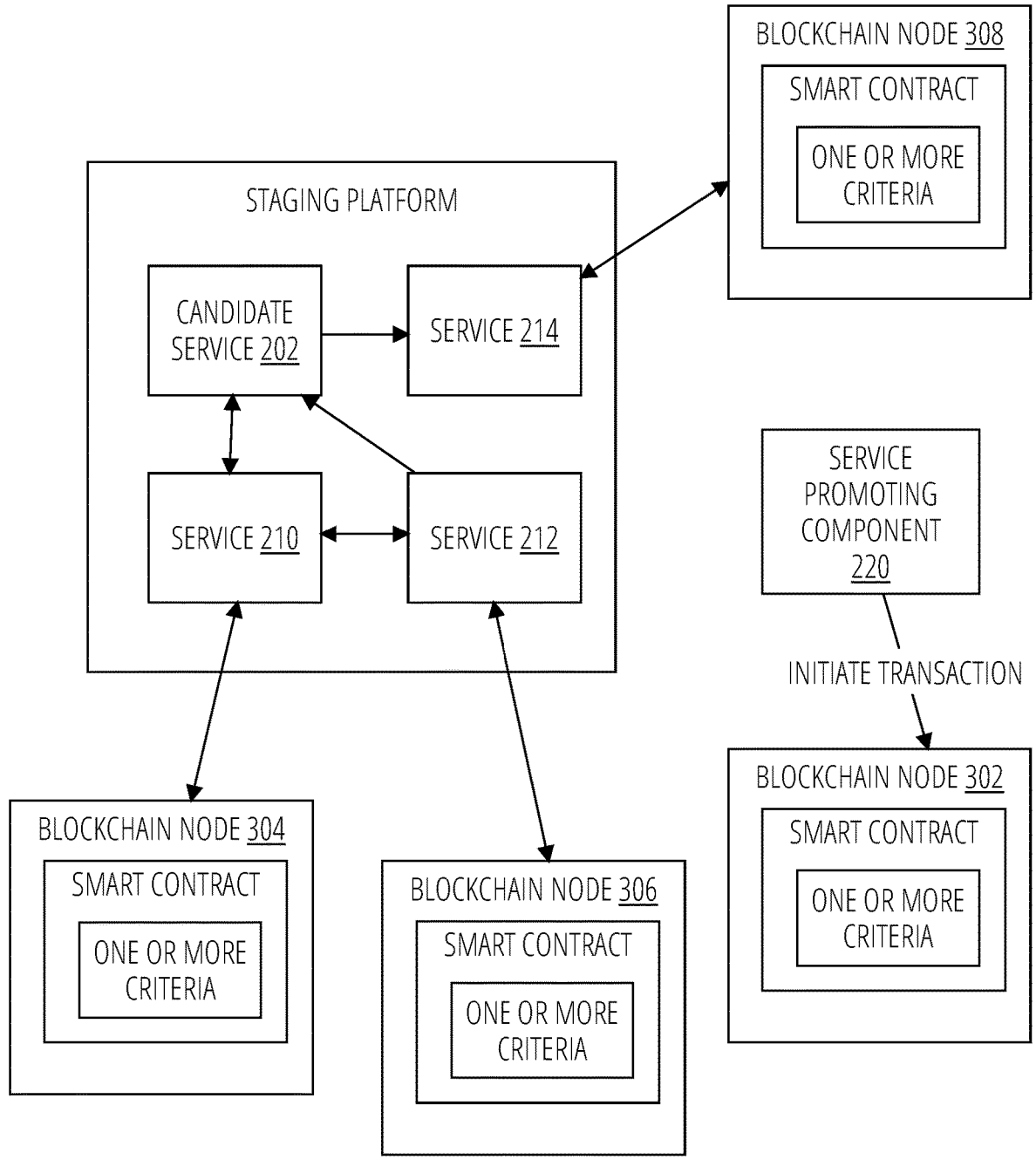
FIG. 3 shows an example validation of a candidate service using blockchain, in accordance with some embodiments.

As described, upon initiation of the blockchain transaction by service promoting component 220, the remaining nodes of the blockchain 208 may attempt to validate the one or more criteria 204 of the smart contract 206, as shown in FIG. 3.

FIG. 3 shows an example validation of a candidate service using blockchain, in accordance with some embodiments. As discussed, a blockchain may include various blockchain nodes that each keep a copy of the blockchain (which is a chain of transactions and data). As such, blockchain 208 as shown in FIG. 2 may include blockchain nodes 302, 304, 306, and 308 that each keep a copy of the blockchain, the smart contract, and the one or more criteria.

As discussed in the example of FIG. 2, service promoting component 220 may initiate a transaction of blockchain 208, which may be performed by the service promoting component 220 as a blockchain node 302 of the blockchain. This initiated transaction may cause the each of the remaining nodes of the blockchain (service 210, service 212, and service 214) to validate the terms of the smart contract.

For example, service 210, acting as a blockchain node 304, may validate that the one or more criteria of the smart contract are satisfied. Service 210 may obtain test data 218 or other data to validate that the candidate service 202 satisfies the one or more criteria. Service 210 then casts a vote as to whether the blockchain transaction should be allowed, based on whether the one or more criteria are satisfied. The other services 212 and 214 may also do the same, acting respectively as blockchain nodes 306 and 308.

In some cases, a consensus may not be reached by the blockchain nodes. For example, not enough of them may agree that the one or more criteria are satisfied. In such a case, the transaction may be rejected and the candidate service 202 is not promoted. Additionally, or alternatively, the candidate service may simply fail to satisfy the one or more criteria. In such a case, service promoting component 220 may refrain from initiating the transaction to the blockchain or blockchain node 302. Further, a notification may be sent to a user to indicate that the one or more criteria 204 are not satisfied by the candidate service, or that the remaining blockchain nodes do not validate the transaction as such. A notification may be presented in the form of an alert or message on an application, an email, or other electronic notification. As such, a user may be notified that the candidate service has not met the one or more criteria 204.

Figure 4:
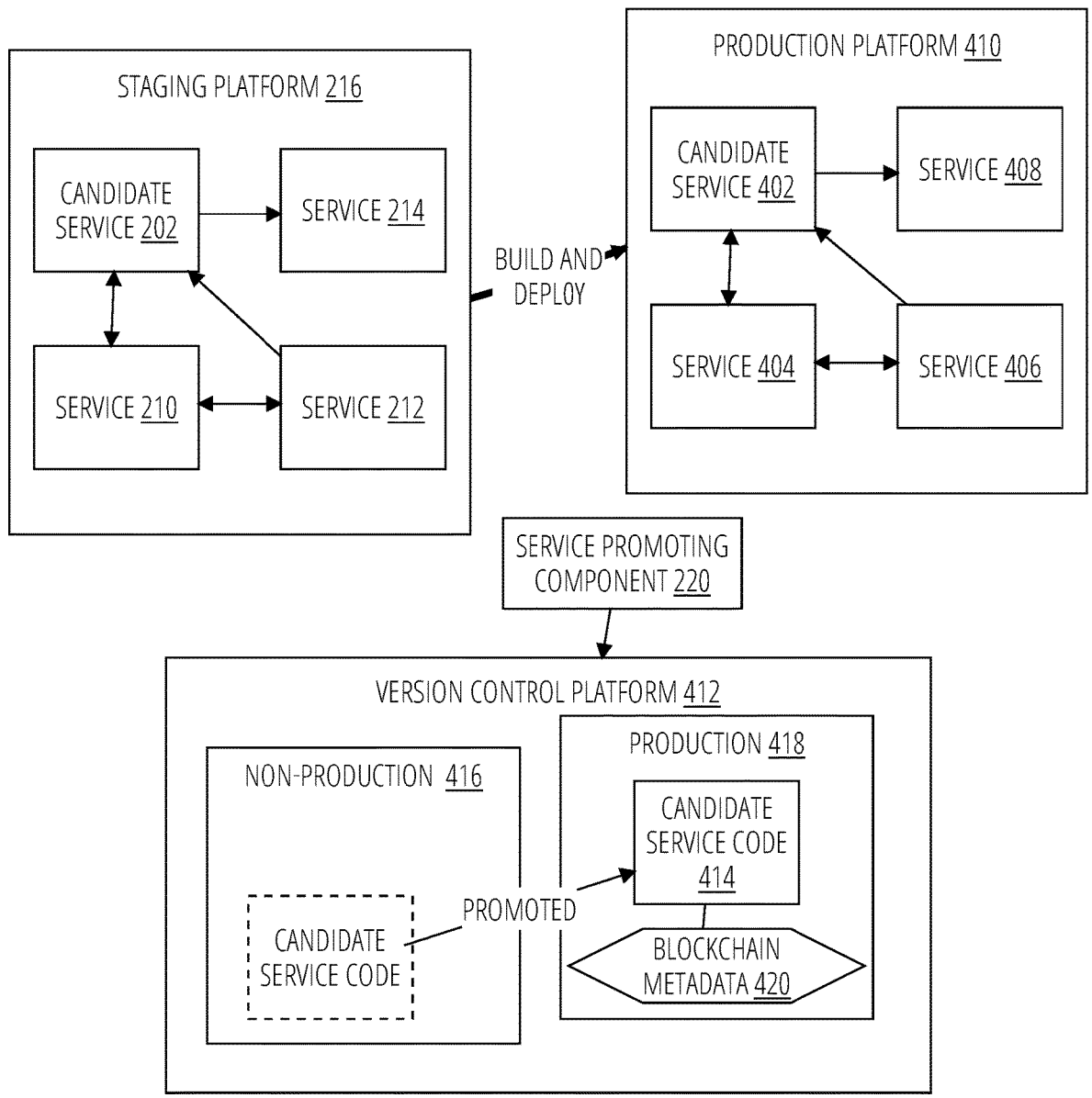
FIG. 4 shows an example promotion of a candidate service using blockchain, in accordance with some embodiments.

FIG. 4 shows an example promotion of a candidate service using blockchain, in accordance with some embodiments. Some of the features shown in this example may extend from the examples of FIG. 2 and FIG. 3. In this example, service promoting component 220 has initiated promotion of candidate service 202 as a transaction on blockchain, as discussed in other sections. The remaining services 210, 212, and 214, while acting as blockchain nodes on the blockchain, have validated this transaction. Service promoting component 220 may, in response to validation of the transaction, promote the candidate service (e.g., from development platform to the staging platform 216, or from the staging platform 216 to a production platform 410).

In some examples, promoting the candidate service 202 includes building the candidate service 402 and deploying the candidate service 402 to a production platform 410. For example, staging platform 216 may include simulated inputs to trigger responses, behavior, and functionality from the microservices application. Different use cases may be simulated to explore various edge cases. Candidate service 202 is tested on the staging platform 216 with other services 210, 212, and 214 which should mirror production services 404, 406, and 408. As such, errors in the production environment may be reduced.

Production platform 410 may include computing devices and network infrastructure that is exposed to one or more users or clients (e.g., on a public or private network). When the candidate service 202 is promoted, service promoting component 220 may automatically build and deploy this as candidate service 402 on the production platform 410. On the production platform, candidate service 402 may work together with services 404, 406, and 408 to operate as a microservices application. Candidate service 402 may be a new service or it may replace an older version of itself in the microservices application.

In some examples, promoting the candidate service 202 may include pushing the candidate service to a production region of a version control platform 412. For example, version control platform 412 may have a non-production region 416 that holds candidate service code 414. Service promoting component 220 may push this code to a production region 418 of the version control platform. In some examples, the non-production region may be a repository that is tagged as 'staging', 'development', 'test', or another non-production indicator. The production region 418 may be a repository that is tagged as 'production'. In other cases, the non-production region 416 and production region 418 may be the same repository, but each file or project may be tagged with metadata that indicates whether it is 'production', 'staging', or 'development'. Examples of a version control platform 412 may include Subversion (SVN), GitHub, or another version control platform.

In some examples, pushing the candidate service code 414 to a production region of a version control platform 412 causes the candidate service 402 to be built and deployed to the production platform 410. For example, processing logic may automatically build and deploy source code that is pushed to the production region 418 to the production platform 410.

As discussed, the blockchain 208 or metadata 420 of the blockchain is linked to the candidate service after the promoting. The blockchain or metadata thereof presents a provenance of the one or more criteria that is satisfied by the candidate service. The metadata 420 may include the terms (e.g., the one or more criteria) of the smart contract, a timestamp, and other information that provides a record of the promotion of the candidate service.

In some examples, service promoting component 220 may execute instructions stored in the smart contract, in response to the one or more services 210, 212, and 214 validating those terms. Those instructions may define the promoting operations of the candidate service 202 discussed herein.

Figure 5:
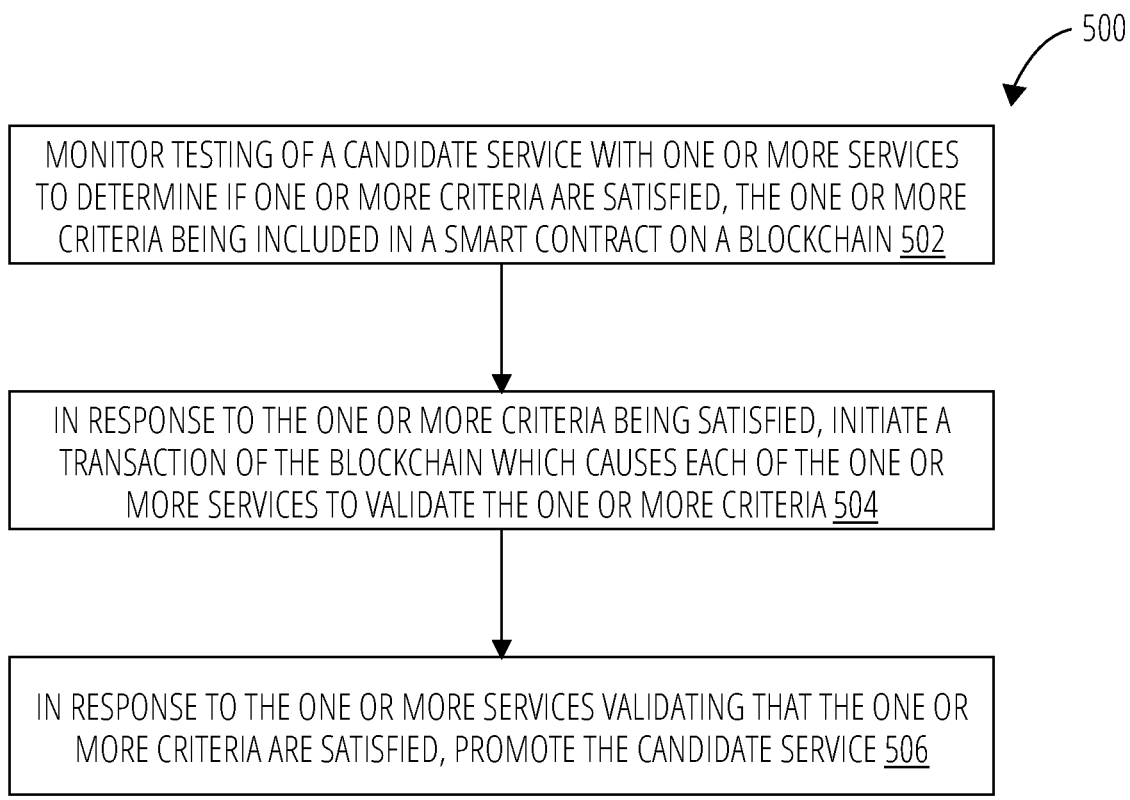
FIG. 5 illustrates a process for promoting a candidate service based on consensus of one or more services using blockchain, in accordance with one embodiment.

FIG. 5 illustrates an example method 500 for promoting a candidate service based on consensus of one or more services using blockchain, in accordance with one embodiment. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

At block 502, processing logic may monitor testing of a candidate service with one or more services to determine if one or more criteria are satisfied, the one or more criteria being included in a smart contract on a blockchain. The candidate service and the one or more services may form a microservices application. The candidate service may be a new or upgraded version of an existing service of the microservices application. Processing logic may obtain test data through various sources, as discussed, to determine if the one or more criteria are satisfied.

At block 504, processing logic may, in response to the one or more criteria being satisfied, initiate a transaction of the blockchain which causes each of the one or more services to validate the one or more criteria. Each of the one or more services may be a blockchain node on the blockchain. The one or more services validate that the terms of the contract are met. They can each obtain test data, compare it to the one or more criteria, and determine whether or not the one or more criteria are satisfied.

At block 506, processing logic may, in response to the one or more services validating that the one or more criteria are satisfied on respective nodes of the blockchain, promote the candidate service. The smart contract may, in some examples, include instructions that processing logic performs to promote the candidate service. In other examples, processing logic may promote the candidate service based on instructions that are internal to processing logic or from another source.

The process may be performed automatically in response to when a candidate service undergoes testing or is placed in a development or staging environment. A developer may mark a service as a candidate. Processing logic may form a blockchain with processing logic as a blockchain node. The remaining services of a microservices application may also inherit attributes of a blockchain node, thereby assuming the role of a blockchain node. Processing logic may monitor testing of a candidate service automatically to determine if the one or more criteria or other terms of the smart contract are met.

In such a manner, validation of a new or upgraded service may be performed in an automated manner. Further, with the use of a blockchain and smart contract, the method builds faith and confidence in the candidate service prior to migration. Further, the criteria on which the candidate service is to satisfy may be validated by each blockchain node of the blockchain. This builds redundancy into the promotion process. Testing and verification of the testing process is improved while offloading work from the developer and simultaneously creating an immutable record of the testing process as a result of a blockchain transaction.

Figure 6:
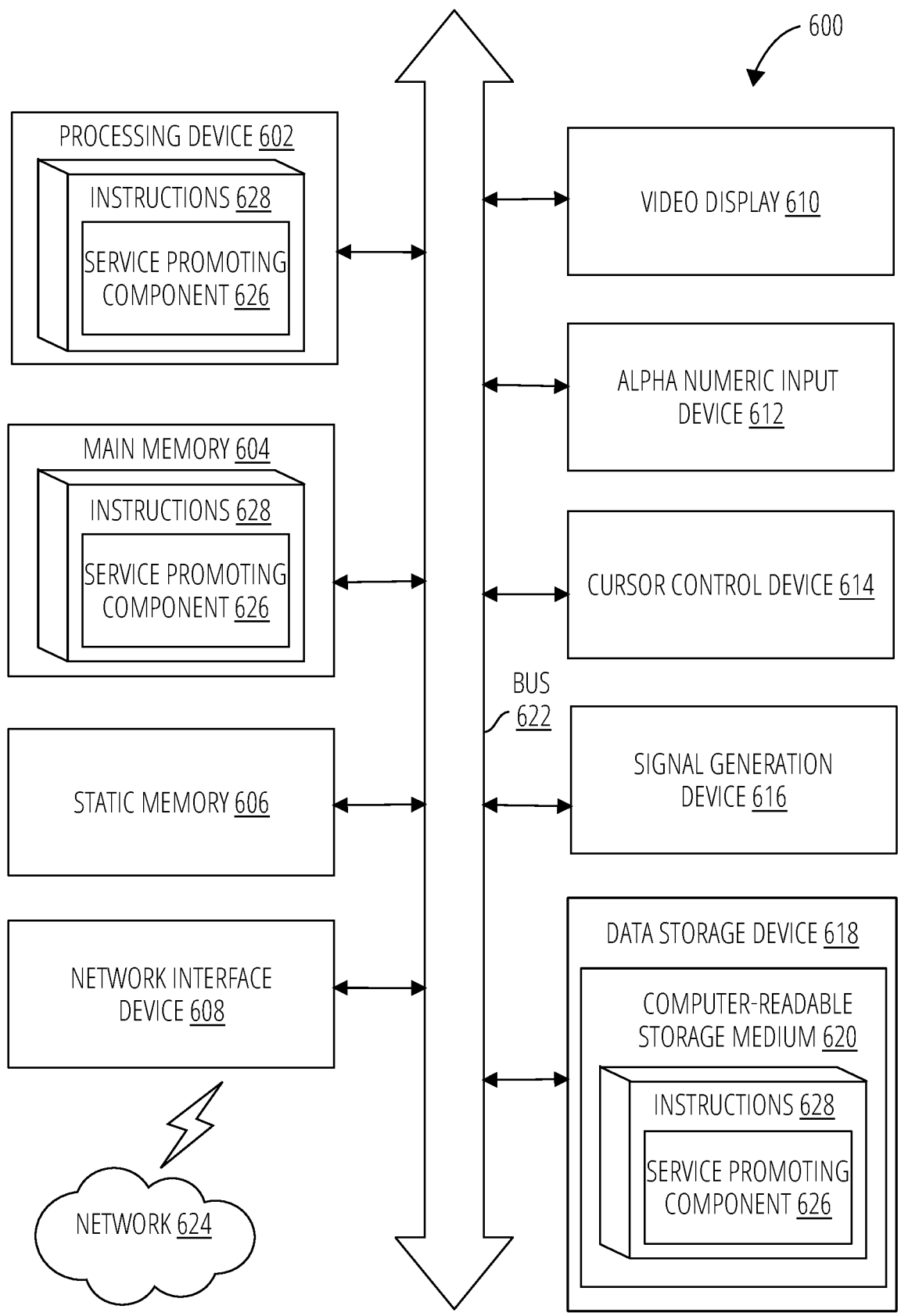
FIG. 6 is a block diagram illustrating a computing device for promoting a consensus based promotion of a candidate service, in accordance with some embodiments.

FIG. 6 is a block diagram of an example computing device 600 that may perform one or more of the operations described herein, in accordance with some embodiments. For example, the computing device may promote a candidate service based on a consensus of one or more services using a blockchain.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 622.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 624. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 620 on which may be stored one or more sets of instructions 628 that may include instructions for a processing device (e.g., processing device 104), for carrying out the operations described herein, in accordance with one or more aspects of the present disclosure. Instructions 628 may also reside, completely or at least partially, within main memory 604 and/or within processing device 602 during execution thereof by computing device 600, main memory 604 and processing device 602 also constituting computer-readable media. The instructions 628 may further be transmitted or received over a network 624 via network interface device 608. The instructions 628 may contain instructions of a service promoting component 626 that, when executed, perform the operations and steps discussed herein.

While computer-readable storage medium 620 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending", "storing", "obtaining", "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component may be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 110, sixth paragraph, for that unit/circuit/component. Additionally, "configured to" or "configurable to" may include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    monitoring testing of a candidate service associated with a microservices application to determine if one or more test criteria are satisfied, the one or more test criteria being included in a smart contract on a blockchain and the one or more test criteria comprising at least one of an up-time of the candidate service or a performance metric of the candidate service;
    in response to the one or more test criteria being satisfied, initiating a transaction of the blockchain which causes each of one or more services of the microservices application which serve as respective nodes of the blockchain to execute the smart contract which comprises each of the one or more services independently validating that the candidate service satisfied the one or more test criteria as included on the smart contract on each of the respective nodes; and
    in response to the one or more services reaching a consensus that the candidate service satisfied the one or more test criteria, promoting the candidate service to be part of the microservices application.

2. The method of claim 1, wherein the blockchain or metadata of the blockchain presents a provenance of the one or more test criteria being satisfied by the candidate service and the blockchain or the metadata of the blockchain is linked to the candidate service after the promotion of the candidate service.

3. The method of claim 1, wherein the one or more test criteria includes a second performance metric of the microservices application as a whole.

4. The method of claim 1, wherein the one or more test criteria includes a CPU utilization or RAM utilization.

5. The method of claim 1, wherein the one or more test criteria includes interactions between the candidate service and at least one of the one or more services.

6. The method of claim 1, wherein the consensus is reached in response to a threshold number of the one or more services of the microservices application validating the candidate service satisfied the one or more test criteria.

7. The method of claim 1, wherein the candidate service is an updated version of an existing service or a new service of the microservices application.

8. The method of claim 1, wherein promoting the candidate service includes building the candidate service and deploying the candidate service to a production platform.

9. The method of claim 1, wherein promoting the candidate service includes pushing the candidate service to a production region of a version control platform.

10. The method of claim 9, wherein pushing the candidate service to the production region of the version control platform causes the candidate service to be built and deployed to a production platform.

11. The method of claim 1, wherein in response to the one or more test criteria not being satisfied by the candidate service or in response to the one or more services not reaching the consensus that the one or more test criteria are satisfied, sending a notification to a user or a device.

12. A system comprising:
    a memory; and
    a processing device operatively coupled to the memory, the processing device to:
        monitor testing of a candidate service associated with a microservices application to determine if one or more test criteria are satisfied, the one or more test criteria being included in a smart contract on a blockchain and the one or more test criteria comprising at least one of an up-time of the candidate service or a performance metric of the candidate service;
        in response to the one or more test criteria being satisfied, initiate a transaction of the blockchain which causes each of one or more services of the microservices application which serve as respective nodes of the blockchain to execute the smart contract which comprises each of the one or more services to independently validate that the candidate service satisfied the one or more test criteria as included on the smart contract on each of the respective nodes; and
        in response to the one or more services reaching a consensus that the candidate service satisfied the one or more test criteria, promote the candidate service to be part of the microservices application.

13. The system of claim 12, wherein the blockchain or metadata of the blockchain which presents a provenance of the one or more test criteria being satisfied by the candidate service is linked to the candidate service after the promotion of the candidate service.

14. The system of claim 12, wherein the one or more test criteria includes a second performance metric of the microservices application as a whole.

15. The system of claim 12, wherein the one or more test criteria includes a CPU utilization or RAM utilization.

16. The system of claim 12, wherein the one or more test criteria includes interactions between the candidate service and at least one of the one or more services.

17. A non-transitory computer-readable storage medium including instructions that, when executed by a processing device, cause the processing device to:
monitor testing of a candidate service associated with a microservices application to determine if one or more test criteria are satisfied, the one or more test criteria being included in a smart contract on a blockchain and the one or more test criteria comprising at least one of an up-time of the candidate service or a performance metric of the candidate service;
in response to the one or more test criteria being satisfied initiate, by the processing device, a transaction of the blockchain which causes each of one or more services of the microservices application which serve as respective nodes of the blockchain to execute the smart contract which comprises each of the one or more services to independently validate that the candidate service satisfied the one or more test criteria as included on the smart contract on each of the respective nodes; and
in response to the one or more services reaching a consensus that the candidate service satisfied the one or more test criteria, promoting the candidate service to be part of the microservices application.

18. The computer-readable storage medium of claim 17, wherein the blockchain or metadata of the blockchain presents a provenance of the one or more test criteria being satisfied by the candidate service and the blockchain or metadata of the blockchain is linked to the candidate service after the promotion of the candidate service.

19. The computer-readable storage medium of claim 17, wherein the one or more test criteria includes a second performance metric of the microservices application as a whole.

20. The computer-readable storage medium of claim 17, wherein the one or more test criteria includes a CPU utilization or RAM utilization.

* * * * *